United States Patent
Tsang et al.

[11] Patent Number: 5,886,065
[45] Date of Patent: Mar. 23, 1999

[54] MEDIATION OF WATERFASTNESS IN INK-JET INK COMPOSITIONS BY USING PARTIAL CHEMICALLY-TREATED MACROMOLECULAR CHROMOPHORES (MMCS)

[75] Inventors: Joseph W. Tsang; John R. Moffatt, both of Corvallis, Oreg.

[73] Assignee: Hewlett-Packard Company, Palo Alto, Calif.

[21] Appl. No.: 823,092

[22] Filed: Mar. 24, 1997

[51] Int. Cl.$^6$ .................................................. C09D 5/00
[52] U.S. Cl. ................................................................ 523/161
[58] Field of Search .......................................... 523/161

[56] References Cited

U.S. PATENT DOCUMENTS

| | | | |
|---|---|---|---|
| 3,528,840 | 9/1970 | Aboytes | 106/307 |
| 4,963,189 | 10/1990 | Hindagolla | 106/22 |
| 5,106,416 | 4/1992 | Moffatt et al. | 106/20 |
| 5,116,409 | 5/1992 | Moffatt | 106/22 |
| 5,133,803 | 7/1992 | Moffatt | 106/25 |
| 5,342,439 | 8/1994 | Lauw | 106/22 H |
| 5,531,816 | 7/1996 | Wickramanayake | 106/20 R |
| 5,648,405 | 7/1997 | Ma et al. | 523/161 |

FOREIGN PATENT DOCUMENTS

| | | | |
|---|---|---|---|
| 0475075 A1 | 8/1991 | European Pat. Off. | C09D 11/00 |
| 0635380 A1 | 7/1993 | European Pat. Off. | B41M 5/38 |
| WO96/18696 | 6/1996 | WIPO | C09D 11/02 |
| WO97/47691 | 12/1997 | WIPO | C09C 1/56 |
| WO97/47699 | 12/1997 | WIPO | C09D 11/00 |

*Primary Examiner*—Edward J. Cain

[57] ABSTRACT

The ink of the invention comprises (a) a vehicle comprising (1) about 1 to 50 wt % of at least one organic solvent as humectants, and (2) about 0.01 to 20 wt % of at least one water-soluble surfactant or amphiphilic polymer (cationic, anionic, or non-ionic); (b) about 1 to 20 wt % of at least one partial chemically-modified, water-soluble colorant, the colorant having sufficient functional groups associated therewith to be substantially waterfast in deionized water while being sufficiently stable in the ink to avoid flocculation; and (c) the balance water. The use of a partial chemically-modified, water-soluble colorant (macromolecular chromophore) results in an ink that is both waterfast and non-flocculating.

19 Claims, 1 Drawing Sheet

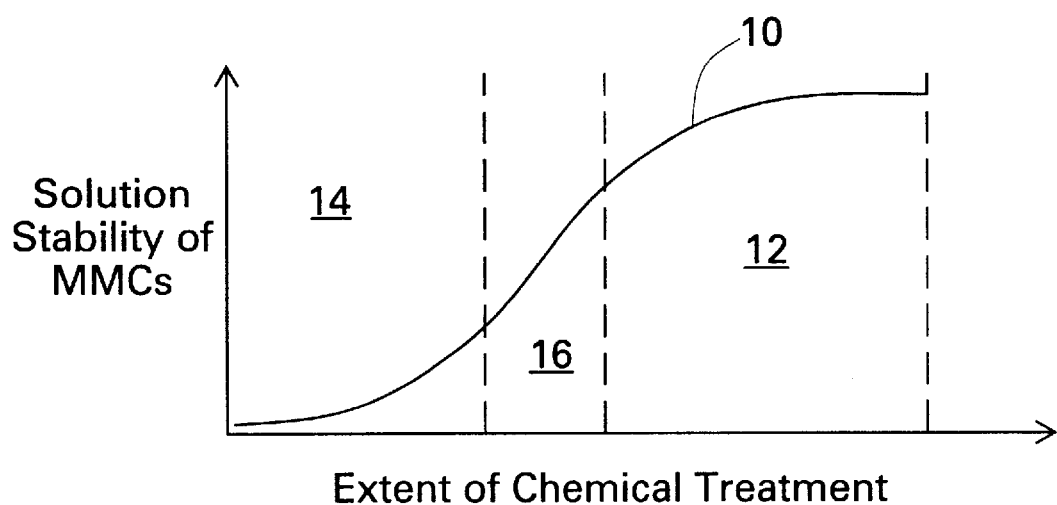

MEDIATION OF WATERFASTNESS IN INK-JET INK COMPOSITIONS BY USING PARTIAL CHEMICALLY-TREATED MACROMOLECULAR CHROMOPHORES (MMCS)

TECHNICAL FIELD

The present invention relates to ink compositions for thermal ink-jet printing in a printer such as Hewlett-Packard's DeskJet® printer.

BACKGROUND ART

Thermal ink-jet printers offer a low cost, high quality, and comparatively noisefree option to other types of printers commonly used with computers. Such printers employ a resistor element in a chamber provided with an egress for ink that entered from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected through a conductive trace to a microprocessor where current-carrying signals cause one or more selected elements to heat up. The heating creates a bubble of ink in the chamber which is expelled through the nozzle toward the print medium. In this way, firing a plurality of such resistor elements in a particular order in a given primitive forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids.

The tight tolerances of the nozzles, typically 50 $\mu$m diameter, require that the ink not clog the nozzles. Further, repeated firings of the resistor elements, which must withstand about 10 million firings over the life of the ink cartridge, can result in fouling of the resistor element. Finally, the ink composition must be capable of interacting with the print medium, especially paper, to penetrate the paper without undue spreading, and the ink composition should be smear- and water-resistant on the paper.

Inks are known which possess one or more of the foregoing properties. However, few ink compositions are known that posses all of those properties, since an improvement in one property often results in the degradation of another. Thus, inks used commercially represent a compromise in an attempt to achieve an ink evidencing at least an adequate performance in each of the aforementioned properties.

In a related application, now U.S. Pat. No. 5,749,952 [PD10960255], a new class of colorants for ink-jet inks, namely, macromolecular chromophores (MMCs) are defined. These materials are commercially available from colorant vendors, such as Cabot Corporation and Orient Chemical. As disclosed therein, the macromolecular chromophores comprise pigments which have been chemically modified to impart water solubility to the otherwise water-insoluble pigments by introducing carboxylate and/or sulfonate functionalities onto the pigment surface (to generate anionic chromophores) or by introducing ammonium or phosphonium functionalities onto the pigment surface (to generate cationic chromophores).

In another related application, now U.S. Pat. No. 5,830,265 [PD 10960257], the chemistries involved for exchanging counterions associated with the functional groups on the MMCs to impart improved properties to the inks using these MMCs. Any of the common ion exchange processes may be used to exchange one counterion for another.

Investigations continue into developing ink formulations that have improved properties such as high edge acuity, high optical density, fast drying times, good waterfastness, and good smearfastness without sacrificing performance in other necessary properties.

DISCLOSURE OF INVENTION

In accordance with the invention, water solubility of the colorant is mediated by the amount of functional group introduced on the MMC; this is achieved by careful control of the extent of chemical treatment. Chemical assays, including titration and oxidation, provide quantitatively the amount of functional groups present.

In particular, the present inventors observed that in a plot of the extent of chemical treatment versus solution stability of MMCs, three regions were found: a first region which represents those MMCs with extensive water soluble functional groups; a second region which represents those MMCs with an insufficient number of functional groups; and a third region, between the first and second regions, considered to be "meta-stable". Inks prepared from fully- or highly-treated MMCs in the first region afford good stability in aqueous solution. However, on printed paper media, complete waterfastness is not readily achieved. Inks prepared from non- or low-treated MMCs in the second region evidence solution instability, which leads to flocculation. The partially-treated MMCs in the third region are still water-soluble, and inks prepared from such partially-treated MMCs show good stability and waterfastness performance on printed papers. Further stability against flocculation is obtained when combined with components such as amphiphilic polymers and surfactants in the inks.

The ink-jet ink of the invention comprises:
(a) a vehicle comprising (1) about 1 to 50 wt % of at least one organic solvent as humectants, and (2) about 0.01 to 20 wt % of at least one water-soluble surfactant or amphiphilic polymer (cationic, anionic, or non-ionic);
(b) about 1 to 20 wt % of at least one partial chemically-modified, water-soluble colorant, the colorant having sufficient functional groups associated there-with to be substantially waterfast on paper while being sufficiently stable in the ink to avoid flocculation; and
(c) the balance water.

Additionally, in further accordance with the invention, a method of ink-jet printing which uses the disclosed inks and exploits the inks' properties is provided.

Finally, a method of preparing the partial chemically-modified, water-soluble colorant(s), which is employed in the ink-jet ink of the present invention is provided.

BRIEF DESCRIPTION OF THE DRAWINGS

The sole FIGURE, on coordinates of extent of chemical treatment and water solubility, is a plot of the solubility of a macromolecular chromophore (MMC) in water as a function of the extent of chemical treatment.

BEST MODES FOR CARRYING OUT THE INVENTION

All concentrations herein are expressed in weight percentages, unless otherwise indicated. The purity of all components is that employed in normal commercial practice for ink-jet inks.

The sole FIGURE illustrates a plot of the extent of chemical treatment versus solution stability of MMCs; a sigmoid-shaped curve (Curve 10) is the result. Region 12 represents those MMCs with extensive water soluble functional groups. Inks prepared from these MMCs afford good stability in solution. However, on printed paper media, complete waterfastness are not readily achieved. Conversely, when insufficient functional groups are introduced, as in region 14, solution instability leads to flocculation.

In accordance with the present invention, the use of partially treated MMCs which are "meta-stable" (region 16) is disclosed in conjunction in ink vehicles containing components which can further solubilize these MMCs. These components include amphiphilic polymers and surfactants. In system as such, inks will provide good waterfastness property on printed paper media in ink-jet ink compositions by either thermal ink-jet or piezoelectric printing mechanism.

By "meta-stable" is meant that point at which the chemically-treated pigment is soluble in aqueous solution, but is not fully treated. Such a meta-stable, or partially treated, pigment will evidence at least 1 to 2 years stability in pure water. The specific region of meta-stability depends on each system, but is readily determined by analytical methods.

For example, in aqueous solutions, relative stability of MMCs is determined by accelerated processes at elevated temperatures that simulate long term stability. Fully-treated MMCs show stability in solution more than 2 years without settling out of solution. The particle size of such fully-treated MMCs remains unchanged before and after the accelerated aging process.

In the case of partially-treated MMCs, sufficient chemical treatment is applied to render the pigment water-soluble, but the MMC is not fully treated. By careful control of the extent of chemical treatment in accordance with the teachings herein, partially-treated MMCs show good stability in aqueous solution by showing no settling under the accelerated aging process. As with the fully-treated MMCs, the particle size remains unchanged. Partially-treated MMCs are considered to be "metastable" under a number of conditions. For example, after printing on papers, these partially-treated MMCs become significantly less water-soluble as demonstrated where little or no colorant transfer takes place in the waterfastness test, as described more fully below under EXAMPLES. In contrast, fully-treated MMCs readily redissolve, and show significant colorant transfer in the waterfastness test. The region of meta-stability is best defined by the amount of colorant transfer in the waterfastness test.

The following ink composition employs the partially treated MMCs:

(a) about 1 to 50 wt % of at least one organic solvent (as humectant);

(b) about 0.01 to 20 wt % water-soluble surfactants and amphiphilic polymers (cationic, anionic and non-ionic);

(c) about 1 to 20 wt % partially treated MMC; and (d) the balance water.

The organic solvent is substantially water-miscible. Classes of solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of solvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The solvent concentration may range from about 1 to 50 wt %, with about 1 to 20 wt % being preferred.

The water-soluble surfactants employed in the practice of the present invention (2) ionic. The former class includes: TERGITOLs; TRITONs, which are alkyl phenyl polyethylene oxide surfactants available from Rohm & Haas Co.; BRIJs; PLURONICs; and the SURFYNOLs; POE esters; POE diesters; POE amines; protonated POE amines; POE amides; and dimethicone copolyols. Ionic surfactants such as substituted amine oxides are useful in the practice of this invention. U.S. Pat. No. 5,106,416, "Bleed Alleviation Using Zwitterionic Surfactants and Cationic Dyes" discloses more fully most of the surfactants listed above. The non-ionic amphiphiles/surfactants are more preferred than the ionic surfactants. Specific examples of amphiphiles/surfactants that are preferably employed in the practice of this invention include, but are not limited to, iso-hexadecyl ethylene oxide 20 (available from ICI America under the tradename as ARLASOLVE 200), TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide. The concentration of the amphiphiles/surfactants may range from 0.01 to about 20 wt %, with about 0.01 to 10 wt % being preferred.]

The amphiphilic polymers, whether cationic, anionic, or non-ionic, are defined herein as those polymers which contain hydrophilic and hydrophobic moieties within the same molecule, and form colloidal aggregates in water as characterized by a number of well-known techniques, such as light scattering. These copolymers are used as dispersing agents for water-insoluble colorants, such as pigments for aqueous inks and water-borne paints.

Polymer dispersants of this type are synthesized from one or more of each of the following hydrophilic and hydrophobic monomers:

A. Hydrophilic monomers include acrylic acid, methacrylic acid, maleic acid, and maleic anhydride.

B. Hydrophobic monomers include styrene, aryl acrylates, and alkyl acrylates of C6 or greater.

Examples of amphiphilic polymers, perhaps more appropriately termed "copolymers", due to the inclusion of the two different moieties (hydrophilic and hydrophobic), and their alkali metal salts include the following: styrene-acrylic acid copolymers, styrene-methacrylic acid copolymers, styrene-maleic acid copolymers, styrene-n-hexyl acrylate-acrylic acid copolymers, styrene-n-hexyl acrylate-methacrylic acid copolymers, styrene-n-hexyl acrylate-maleic acid copolymers, benzyl acrylateacrylic acid copolymers, benzyl acrylate-methacrylic acid copolymers, benzyl acrylate-maleic acid copolymers, benzyl acrylate-n-hexyl acrylate-acrylic acid copolymers, benzyl acrylate-n-hexyl acrylate-methacrylic acid copolymers, and benzyl acrylate-n-hexyl acrylate-maleic acid copolymers. The alkali metals employed in these salts are selected from the group consisting of lithium, sodium, and potassium. The concentration of the combination of water-soluble surfactant (s) and/or amphiphilic polymer(s) is within the range of about 0.01 to about 20 wt % of the ink formulation, and preferably about 0.01 to 10 wt %.

Colorants suitable for use in this invention include all partial chemically-modified, water-soluble pigments (black and color). The chemical modification imparts water-solubility to the pigment precursors, which encompass all organic pigments, while retaining the waterfastness when inks prepared from these partially-treated pigments are printed on print media. Under typical chemical processes, the resulting surfaces consist of carboxylate and/or sulfonate functionalities for anionic chromophores and quaternary ammonium ($NR_3^+$) or phosphonium ($PR_3^+$) functionalities for cationic chromophores. Depending on the process selected, the chromophore can either be anionic or cationic in character. For example, acidic functionality such as sulfonic acid functionalization results from exhaustive sulfonation with fuming sulfuric acid, while carboxylic acid groups result from either chemical or catalytic oxidative reactions. Conversely, basic chromophores containing ammonium ions result from reductive amidation reactions.

The chemical modification approach differs from the use of amphiphilic polymers and like surfactant species, which have been traditionally used to solubilize water-insoluble colorants. In aqueous solutions, the chemically-modified chromophores possess excellent water solubility without the use of other solubilizing additives such as amphiphilic polymers and surfactants. Black inks prepared from these water-soluble chromophores provide printed media with black optical density commonly found in toners used in Hewlett-Packard's Laser-Jet® printers.

The chemical modification is a far less process-intensive procedure, and avoids the more common approach of ball milling the carbon black or color pigment in the presence of an amphiphilic polymer or surfactant.

It should be noted that the chemical treatment is only partial, and not total, as shown in the sole FIGURE. The extent of chemical treatment will differ from pigment to pigment. However, the determination of the appropriate extent of chemical treatment is readily determined by experimentation, but such experimentation is not considered to be undue. The extent of chemical treatment is determined by the waterfastness test on print papers as described below. It should be noted that deionized water is used as the sole vehicle in the test.

The water-soluble black chromophores employed in the practice of the present invention are commercially available from colorant vendors such as Cabot Corp. and Orient Chemical. Many pigments are useful in the practice of this invention. The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

For anionic chromophores, the counterions include all alkali metal ions and alkaline earth metal ions, as well as both substituted and unsubstituted ammonium ions. For cationic chromophores, suitable counterions include all halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

A preferred pigment is a chemically-treated carbon black particle with mean diameter ranging from about 0.005 to 12 μm. Colorants of this type result from chemical reactions where solvent-accessible functional groups are derivatized to provide solubilizing groups that render the colorant soluble in water. This resulting macromolecular chromophore (MMC) is water-soluble, with its solubility being similar to that of well known and commercially used water-soluble acidic and basic dyes.

A typical formulation for an ink useful in the practice of the present invention includes at least one water-soluble surfactant and/or at least one amphiphilic polymer (0 to about 20 wt %), at least one solvent and/or at least one co-solvent (about 1 to 50 wt %), a partially-treated colorant (about 1 to 20 wt %), and water.

To improve optical density, between 0 and about 3 wt % of at least one high molecular weight colloid derived from natural or synthetic sources may optionally be added to the ink formulation. Addition of a high molecular weight colloid improves print quality. Examples of high molecular weight colloids employed in the practice of this invention include, but are not limited to, alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids which Control Bleed." The preferred high molecular weight colloids employed in the practice of this invention include, but are not limited to, low viscosity, Na alginate. The preferred concentration of the high molecular weight component colloid in the inks of this invention is about 0.25 wt %.

The ingredients are combined and stirred mechanically or mixed using low power sonication.

Preferred ink compositions employing the partial chemically-treated MMCs include (1) about 3 to 10 wt % of either a carboxylated MMC or a sulfonated MMC, (2) about 0.1 to 3 wt % of a BRIJ, PLURONIC, or TERGITOL surfactant; (3) about 5 to 10 wt % of at least one of 1,5-pentanediol, diethylene glycol, and 2-pyrrolidone, and (4) the balance water.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

EXAMPLES

A waterfastness test was used that measures the amount of colorant transferred from a printed area to an unprinted area when tested. In essence, the test consists of dripping 250 μpl of deionized water onto a paper on which a series of horizontal bars have been printed. The paper is maintained at an angle of 45°. The dripping of water is repeated several times on the printed pattern. At a specific time (5 minutes or 10 minutes after printing), the optical density between the bars is measured and compared to that of solid fill blocks. The amount of colorant transfer as a result of the dripping is expressed in milli-optical density units (mOD). Waterfast colorants show little or no transfer between the bars, typically less than 200 mOD (<0.2 OD) units for common photocopy and ink-jet papers. Typical black inks, whether derived from water-soluble dyes or pigment dispersion, show optical densities between 1.4 to 1.6 OD before the waterfastness test. A transfer in the range of about 300 to 800 mOD (0.3 to 0.8 OD), which results from full chemical treatment, is not considered to be waterfast.

A series of inks were formulated comprising 5 wt % MMC in deionized water. The waterfastness was measured 5 minutes after printing and no further change was observed after 24 hours. This indicated that waterfastness is achieved quickly (5 minutes) and does not require extended drying to achieve complete waterfastness (24 hours).

A series of partially treated MMCs were tested on plain papers, both copy papers and bond papers. The paper designations used are as follows:

| | |
|---|---|
| GBND | Gilbert Bond |
| CDCY | Champion Datacopy |
| HFDP | Hammermill Fore DP |
| WFCH | Weyerhauser First Choice |
| PMCY | Papyrus Multicopy. |

The Table below lists the results obtained for three inks as formulated above containing sulfonated MMCs and for two inks as formulated above containing carboxylated MMCs.

TABLE

Waterfastness[1] Results on Different Papers.

| | % Treated | GBND | CDCY | HFDP | WFCH | PMCY |
|---|---|---|---|---|---|---|
| Sulfonated MMC | ca 100 | 590 | 610 | 620 | 600 | 750 |
| Sulfonated MMC | 72 | 10 | 30 | 5 | 5 | 100 |
| Sulfonated MMC | 48 | 0 | 2 | 0 | 0 | 40 |
| Carboxylated MMC | ca 100 | 7 | 360 | 4 | 0 | 50 |
| Carboxylated MMC | 80 | 0 | 1 | 0 | 0 | 2 |

Note:
[1]mOD transfer, 5 min after printing

In the case of the sulfonated MMC, 72% treatment results in an ink that evidences borderline waterfastness. However, at 48% treatment, the ink may be considered to be waterfast. Yet, at this level of treatment, there is no concern about solution instability and flocculation.

In the case of the carboxylated MMC, 80% treatment results in an ink that may be considered to be waterfast, yet, again, without the concern about solution instability and flocculation.

INDUSTRIAL APPLICABILITY

The ink compositions of the invention are expected to find use in thermal ink-jet inks, especially where improved ink characteristics, such as high edge acuity, high optical density, fast drying time, waterfastness, and smearfastness, are desired.

Thus, there has been disclosed a thermal ink-jet ink for thermal ink-jet printing comprising a vehicle containing a water-soluble surfactant(s) and/or amphiphilic co-polymer (s), an organic solvent(s) and/or organic co-solvent(s), a partially-treated, water-soluble colorant, and water. It will be apparent to those skilled in this art that various changes and modifications of an obvious nature may be made; all such changes and modifications are considered to fall within the scope of this invention.

What is claimed is:

1. A thermal ink-jet ink for thermal ink-jet printing comprising:
   (a) a vehicle comprising (1) about 1 to 50 wt % of at least one organic solvent, and (2) about 0.01 to 20 wt % of at least one water-soluble surfactant or amphiphilic polymer;
   (b) about 1 to 20 wt % of at least one partially chemically-modified, water-soluble macromolecular chromophore, said macromolecular chromophore having sufficient functional groups associated therewith to be substantially waterfast on paper while being sufficiently stable in said ink to avoid flocculation and wherein said functional groups are selected from the group consisting of corboxylate, sulfonate, quaternary ammonium, phosphonium, and mixtures thereof; and
   (c) the balance water.

2. The ink-jet ink of claim 1, wherein said at least one organic solvent is selected from the group consisting of aliphatic alcohols, aromatic alcohols, diols, glycol ethers, poly(glycol) ethers, caprolactams, formamides, acetamides, and long chain alcohols.

3. The ink-jet ink of claim 2, wherein said at least one organic solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1, ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted ormamides, substituted acetamides, and unsubstituted acetamides.

4. The ink-jet ink of claim 3 wherein said at least one organic solvent is selected from the group consisting of 1,5-pentanediol, 2-pyrrolidone, 2-ethyl-2-hydroxymethyl-1, 3-propanediol, diethylene glycol, 3-methoxybutanol, and 1,3-dimethyl-2-imidazolidinone.

5. The ink-jet ink of claim 1, wherein said at least one solvent is present within a range of about 1 to 20 wt %.

6. The ink-jet ink of claim 1, wherein said at least one water-soluble surfactant is selected from the group consisting of either (1) a non-ionic or amphoteric surfactant selected from the group consisting of alkyl phenyl polyethylene oxides, polyethylene oxide esters, polyethylene oxide diesters, polyethylene oxide amines, protonated polyethylene oxide amines, polyethylene oxide amides, and dimethicone copolyols, or (2) an ionic surfactant selected from the group consisting of amine oxides.

7. The ink-jet ink of claim 6, wherein said at least one surfactant is selected from the group consisting of iso-hexadecyl ethylene oxide 20, alkyl phenyl polyethylene oxide 15-S-7, N,N-dimethyl-N-docecyl amine oxide, N,N-dimethyl-N-tetradecyl amine oxide , N,N-dimethyl-N-hexadecyl amine oxide, N,N-dimethyl-N-octadecyl amine oxide, and N,N-dimethyl-N-(Z-9-octadecenyl)-N-amine oxide.

8. The ink-jet ink of claim 1, wherein said at least one amphiphilic polymer is selected from the group consisting of alkali metal salts of styrene-acrylic acid copolymers, styrene-methacrylic acid copolymers, styrene-maleic acid copolymers, styrene-n-hexyl acrylate-acrylic acid copolymers, styrene-n-hexyl acrylate-methacrylic acid copolymers, styrene-n-hexyl acrylate-maleic acid copolymers, benzyl acrylateacrylic acid copolymers, benzyl acrylate-methacrylic acid copolymers, benzyl acrylate-maleic acid copolymers, benzyl acrylate-n-hexyl acrylate-acrylic acid copolymers, benzyl acrylate-n-hexyl acrylate-methacrylic acid copolymers, and benzyl acrylate-n-hexyl acrylate-maleic acid copolymers, wherein said alkali metal salts include at least one alkali metal selected from the group consisting of lithium, sodium, and potassium.

9. The ink-jet ink of claim 1, wherein said at least one surfactant or amphiphilic polymer is present within a range of about 0.1 to 10 wt %.

10. The ink-jet ink of claim 1, wherein said macromolecular chromophore comprises pigments selected from the group consisting of black, cyan, yellow, and magenta pigments.

11. The ink-jet ink of claim 10, wherein said colorant is anionic and is associated with a counterion selected from the group consisting of alkali metal ions, alkaline earth metal ions, substituted ammonium ions, and unsubstituted ammonium ions.

12. The ink-jet ink of claim 11, wherein said functional groups on said anionic pigment are selected from the group consisting of sulfonate and carboxylate ions.

13. The ink-jet ink of claim 10, wherein said pigment is cationic and is associated with a counterion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphate, phosphonate, hexaflurophosphonate, phosphene, phenolate, perchlorate, tungstate, molybdate, and silicate ions.

14. The ink-jet ink of claim 13, wherein said functional groups on said cationic pigment consist essentially of quaternary ammonium ions and phosphonium ions.

15. The ink-jet ink of claim 1, wherein said macromolecular chromophore exhibits a transfer of ink of less than 0.2 optical density units when water is dripped on horizontal bars of said ink printed on paper.

16. A method of ink-jet printing comprising printing on a medium with an ink-jet ink having the following composition:

(a) a vehicle comprising (1) about 1 to 50 wt % of at least one organic solvent, and (2) about 0.01 to 20 wt % of at least one water-soluble surfactant or amphiphilic polymer;

(b) about 1 to 20 wt % of at least one partially chemically-modified, water-soluble macromolecular chromophore, said macromolecular chromophore having sufficient functional groups associated therewith to be substantially waterfast in deionized water while being sufficiently stable in said ink to avoid flocculation and wherein said functional groups are selected from the group consisting of carboxylate, sulfonate, quaternary ammonium, phosphonium, and mixtures thereof; and (c) the balance water.

17. The method of claim 16, wherein said macromolecular chromophore exhibits a transfer of ink of less than 0.2 optical density units when water is dripped on horizontal bars of said ink printed on paper.

18. A method for formulating inks containing water-soluble macromolecular chromophores for ink-jet printing comprising:

(a) providing at least one pigment;

(b) partially treating said at least one pigment to associate a sufficient number of functional groups with said at least one pigment such that said at least one pigment is substantially waterfast on paper while being sufficiently stable in said ink to avoid flocculation and wherein said functional groups are selected from the group consisting of carboxylate, sulfonate, quaternary ammonium, phosphonium, and mixtures thereof; and (c) combining about 1 to 20 wt % of said partially-treated pigment with (1) a vehicle comprising (i) about 1 to 50 wt % of at least one organic solvent, and (ii) about 0.01 to 20 wt % of at least one water-soluble surfactant or amphiphilic polymer and (2) the balance water to form said ink.

19. The method of claim 18, wherein said pigment exhibits a transfer of ink of less than 0.2 optical density units when water is dripped on horizontal bars of said ink printed on paper.

* * * * *

UNITED STATES PATENT AND TRADEMARK OFFICE
CERTIFICATE OF CORRECTION

PATENT NO. : 5,886,065
DATED : March 23, 1999
INVENTOR(S) : Tsang et al.

It is certified that error appears in the above-identified patent and that said Letters Patent is hereby corrected as shown below:

IN THE SPECIFICATION

Column 4, (line 25), after "invention" insert --are conveniently divided into two categories: (1) non-ionic and amphoteric and--.

Column 7, (line 33), delete "250 μpl" and insert therefor --250 μl--.

IN THE CLAIMS

Column 9, (line 5), delete "1, ω-alcohols" and insert therefor --1,ω-alcohols--.

Column 9, (line 12), delete "ormamides" and insert therefor --formamides--.

Column 9, (line 60), delete "colorant" and insert therefor --pigment--.

Column 10, (line 9), delete "phosphate" and insert therefor --phosphite--.

Signed and Sealed this

Eighth Day of May, 2001

Attest:

NICHOLAS P. GODICI

*Attesting Officer*   Acting Director of the United States Patent and Trademark Office